United States Patent
Chaney, Jr. et al.

(10) Patent No.: US 10,118,611 B2
(45) Date of Patent: Nov. 6, 2018

(54) SYSTEM AND METHOD FOR PREVENTING CONTACT BETWEEN A TRUCK CAB AND A FIFTH WHEEL TRAILER

(71) Applicant: GM Global Technology Operations LLC, Detroit, MI (US)

(72) Inventors: Michael T. Chaney, Jr., Royal Oak, MI (US); Allan K. Lewis, Windsor (CA); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 98 days.

(21) Appl. No.: 15/335,979

(22) Filed: Oct. 27, 2016

(65) Prior Publication Data

US 2018/0118199 A1    May 3, 2018

(51) Int. Cl.
*B60W 30/09* (2012.01)
*B62D 53/08* (2006.01)
(Continued)

(52) U.S. Cl.
CPC .......... *B60W 30/09* (2013.01); *B60W 10/184* (2013.01); *B60W 10/20* (2013.01);
(Continued)

(58) Field of Classification Search
CPC ...... B60W 30/09; B60W 40/10; B60W 50/14; B60W 50/12; B60W 40/114; B60W 30/095; B60W 10/20; B60W 10/184; B60W 2420/62; B60W 2520/22; B60W 2520/28; B60W 2510/20; B60W 2422/00; B60W 2422/70; B60W 2420/54; B60W 2420/42; B60W 2420/403; B60W 2300/145; B60W 2300/12; B60W 2750/308; B60W 2510/109; B60W 2710/202; B60W 2710/182; B60W 2560/00; B60W 2530/18; B62D 53/0871; B60Y 2300/28; B60Y 2200/148; B60Y 2200/14; B60Y 2300/09
(Continued)

(56) References Cited

U.S. PATENT DOCUMENTS

| 6,714,124 B2 * | 3/2004 | Meyer | B62D 53/0871 200/61.44 |
| 2008/0024283 A1 * | 1/2008 | Kim | B60Q 9/006 340/431 |

OTHER PUBLICATIONS

Glossary of Judicial Claim Constructions in the Electronics, Computer and Business Method Arts. Public Patent Foundation. (2010).

* cited by examiner

*Primary Examiner* — Brian P Sweeney

(57) ABSTRACT

A system according to the present disclosure includes a trailer distance module, a trailer contact module, a trailer distance module, and at least one of a driver warning module, a brake control module, and a steering control module. The trailer distance module determines a distance from a cab of a truck to a fifth wheel trailer attached to the truck based on an input from a sensor. The trailer contact module identifies potential contact between the trailer and the truck cab based on the cab-to-trailer distance. The driver warning module warns a driver of the potential contact. The brake control module applies a brake of at least one of the truck and the trailer when potential contact is identified. The steering control module increases an amount of driver effort required to steer the truck in at least one direction when potential contact is identified.

20 Claims, 9 Drawing Sheets

(51) Int. Cl.
*B60W 10/184* (2012.01)
*B60W 10/20* (2006.01)
*B60W 30/095* (2012.01)
*B60W 40/114* (2012.01)
*B60W 50/12* (2012.01)
*B60W 50/14* (2012.01)
*B60W 40/10* (2012.01)

(52) U.S. Cl.
CPC .......... *B60W 30/095* (2013.01); *B60W 40/10* (2013.01); *B60W 40/114* (2013.01); *B60W 50/12* (2013.01); *B60W 50/14* (2013.01); *B62D 53/0871* (2013.01); *B60W 2300/12* (2013.01); *B60W 2300/145* (2013.01); *B60W 2420/403* (2013.01); *B60W 2420/42* (2013.01); *B60W 2420/54* (2013.01); *B60W 2420/62* (2013.01); *B60W 2422/00* (2013.01); *B60W 2422/70* (2013.01); *B60W 2510/109* (2013.01); *B60W 2510/20* (2013.01); *B60W 2520/22* (2013.01); *B60W 2520/28* (2013.01); *B60W 2530/18* (2013.01); *B60W 2560/00* (2013.01); *B60W 2710/182* (2013.01); *B60W 2710/202* (2013.01); *B60W 2750/308* (2013.01); *B60Y 2200/14* (2013.01); *B60Y 2200/148* (2013.01); *B60Y 2300/09* (2013.01); *B60Y 2300/28* (2013.01)

(58) Field of Classification Search
USPC .......................................................... 701/41
See application file for complete search history.

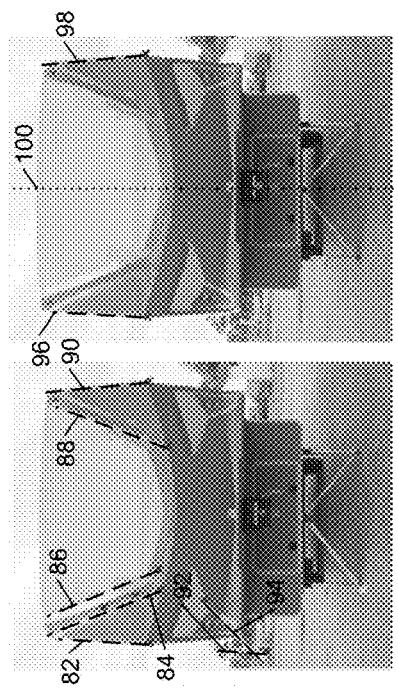
FIG. 13
FIG. 12
FIG. 11
FIG. 10
FIG. 9
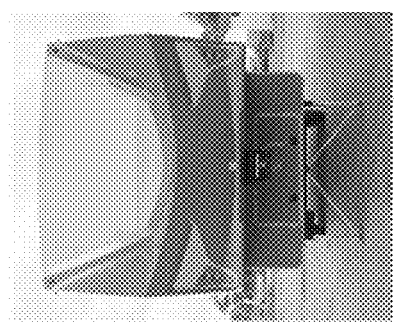

SYSTEM AND METHOD FOR PREVENTING CONTACT BETWEEN A TRUCK CAB AND A FIFTH WHEEL TRAILER

FIELD

The present disclosure relates to vehicle control systems and methods, and more particularly, to systems and methods for preventing contact between a truck cab and a fifth wheel trailer.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many pickup trucks have trailer hitches that are attached to the rear end of a chassis. In contrast, a fifth wheel trailer hitch is typically mounted directly over the rear axle of a pickup truck. Thus, a fifth wheel trailer may contact the occupant cabin or cab of the pickup truck when, for example, the pickup truck makes a sharp turn.

A fifth wheel trailer includes a kingpin or gooseneck located near the front of the trailer that is inserted into the fifth wheel hitch on a pickup truck or semi-trailer truck to attach the trailer to the truck. Dynamic fifth wheel trailer hitches include a cam-actuated device that moves the entire trailer hitch rearward as kingpin rotates in the trailer hitch away from a position corresponding to the longitudinal centerlines of the truck and the trailer being aligned with one another. While dynamic fifth wheel trailer hitches may prevent contact between the trailer and the cab of the truck, they are much more costly than regular fifth wheel trailer hitches. In addition, dynamic fifth wheel trailer hitches are purely mechanical systems, and are therefore limited in their functionality.

SUMMARY

A system according to the present disclosure includes a trailer distance module, a trailer contact module, a trailer distance module, and at least one of a driver warning module, a brake control module, and a steering control module. The trailer distance module determines a distance from a cab of a truck to a fifth wheel trailer attached to the truck based on an input from a sensor. The trailer contact module identifies potential contact between the trailer and the truck cab based on the cab-to-trailer distance. The driver warning module warns a driver of the potential contact. The brake control module applies a brake of at least one of the truck and the trailer when potential contact is identified. The steering control module increases an amount of driver effort required to steer the truck in at least one direction when potential contact is identified.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 9-13 are images of the fifth wheel trailer of FIG. 1 illustrating various steps of the method of FIG. 8.

In the drawings, reference numbers may be reused to identify similar and/or identical elements.

DETAILED DESCRIPTION

A control system and method according to the present disclosure determines a width of a fifth wheel trailer and a distance between the trailer and a cab of a truck, and identifies potential contact between the trailer and the truck cab based on the trailer width and/or the cab-to-trailer distance. In one example, the control system and method determines the trailer width and the cab-to-trailer distance using one or more images generated by a cargo bed camera mounted to the truck cab. The control system and method may identify potential contact between the trailer and the truck cab based directly on the trailer width and/or the cab-to-trailer distance. Alternatively, the control system and method may identify potential contact between the trailer and the truck cab based on another parameter that is determined based on the trailer width and/or the cab-to-trailer distance. An example of such a parameter is an angle between the longitudinal centerline of the truck and the longitudinal centerline of the trailer.

When potential contact between the trailer and the truck cab is identified, the control system and method takes one or more remedial actions to prevent the contact. For example, the control system and method may warn a driver of the truck that potential contact has been identified using an electronic display, a speaker, and/or a haptic feedback device. In another example, the control system and method may apply the brakes of the truck and/or control a steering actuator to increase an amount of effort that the driver must exert to steer the truck in at least one direction (i.e., left or right).

Thus, a control system and method according to the present disclosure may be used to prevent contact between a fifth wheel trailer and a truck cab without using a costly dynamic fifth wheel trailer hitch. In addition, a control system and method according to the present disclosure offers more functionality than purely mechanical solutions for preventing contact between a fifth wheel trailer and a truck cab. Examples of this additional functionality include the remedial actions for preventing contact between a fifth wheel trailer and a truck cab discussed above.

Figure 1:
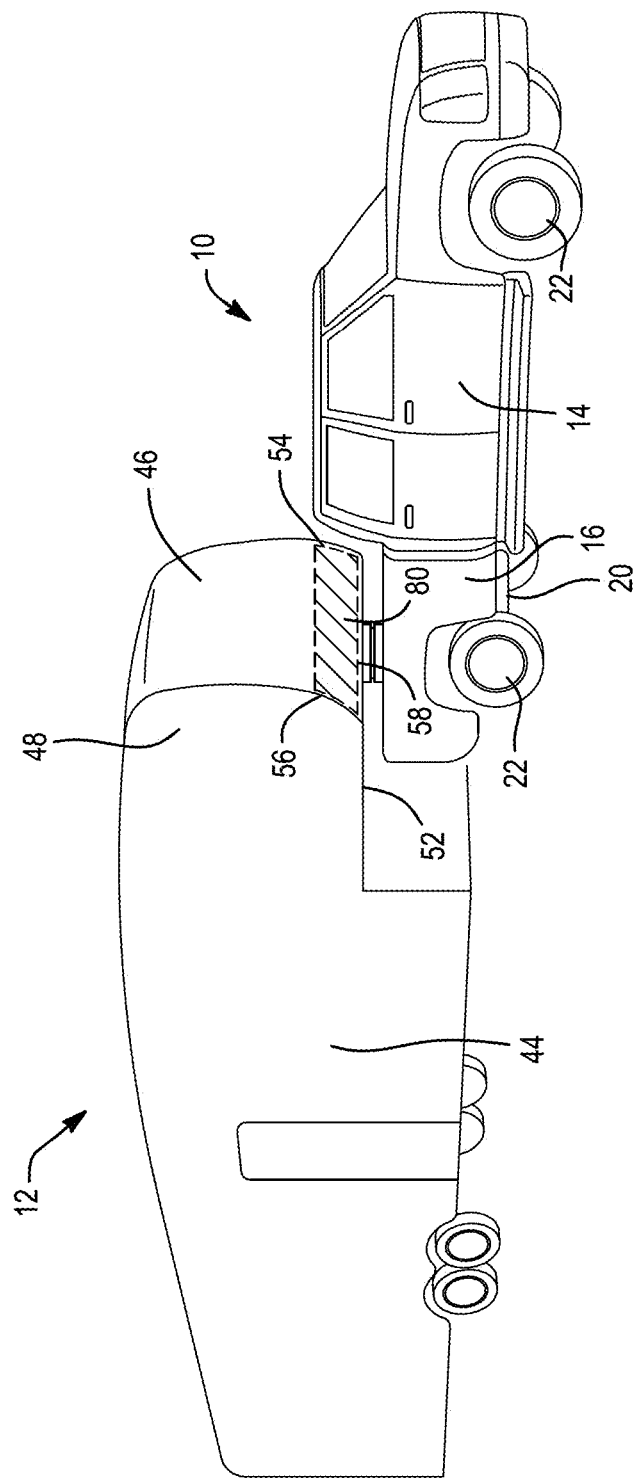
FIG. 1 is a perspective view of an example truck and an example fifth wheel trailer according to the principles of the present disclosure.
Figure 2:
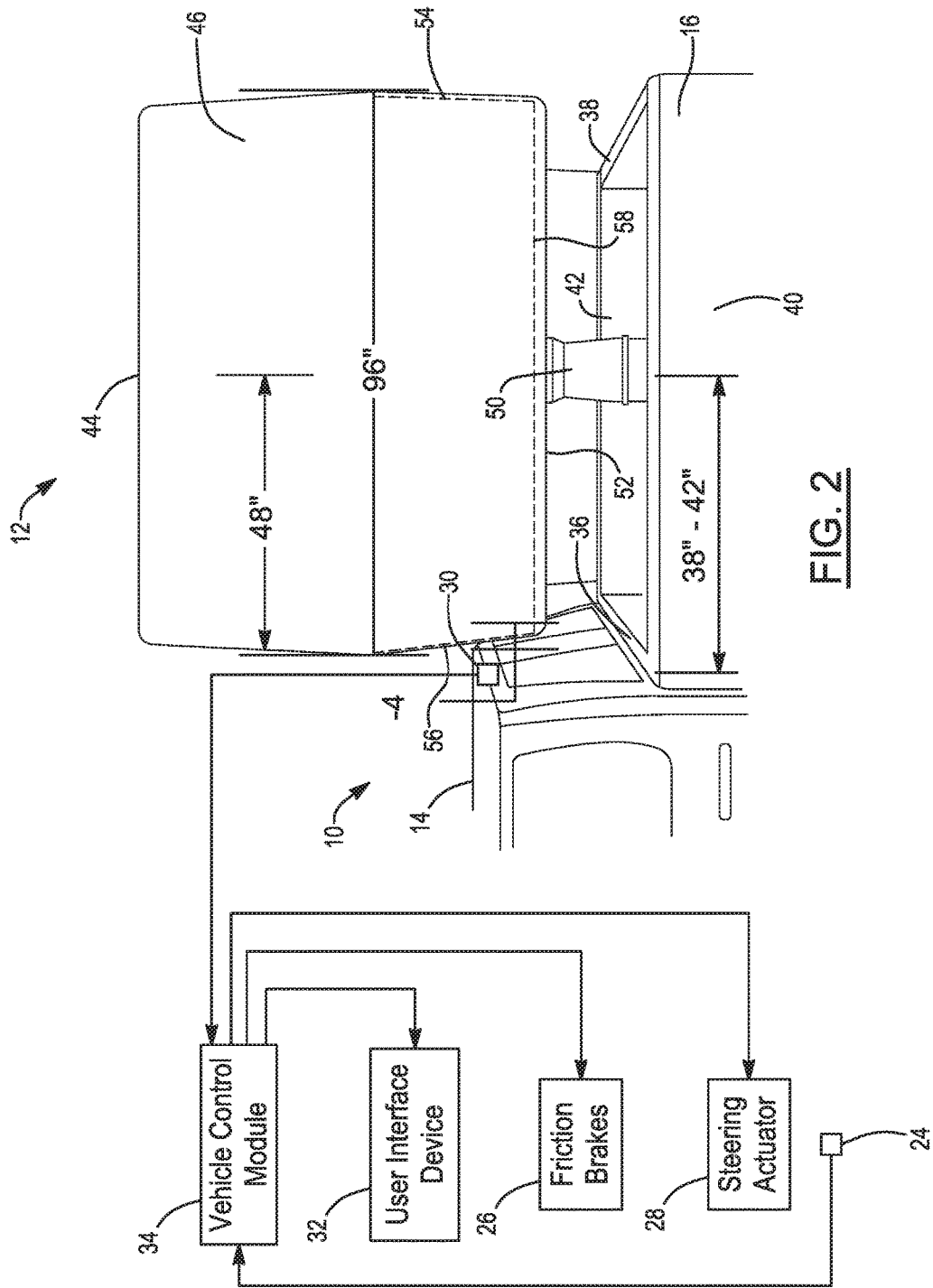
FIG. 2 is another perspective view of the truck and fifth wheel trailer of FIG. 1.
Figure 3:
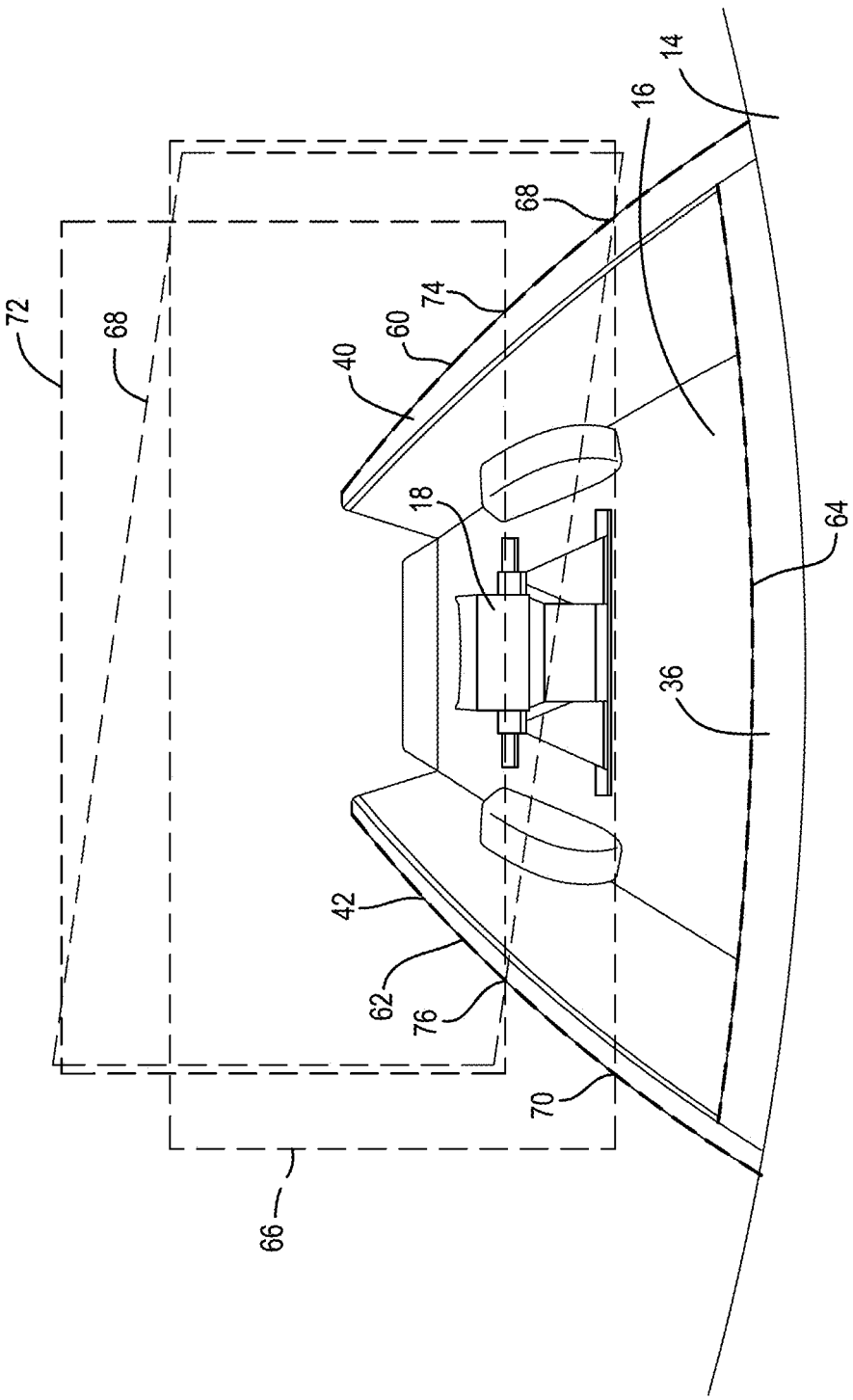
FIG. 3 is a perspective view of a cargo bed of the truck of FIG. 1 and is an example of an image generated by a cargo bed camera of the truck of FIG. 1.

Referring now to FIGS. 1-3, examples of a truck 10 and a fifth wheel trailer 12 are shown. The truck 10 includes a cab 14, a cargo bed 16, a trailer coupling device or fifth wheel hitch 18, a rear axle 20, wheels 22, one or more wheel speed sensors 24, one or more friction brakes 26, a steering actuator 28, a cargo bed camera 30, a user interface device 32, and a vehicle control module (VCM) 34. The cargo bed 164 has a front end 36, a rear end 38, a left side 40, and a right side 42. The fifth wheel hitch 18 is disposed in the cargo bed 16 and is located above the rear axle 20.

The wheel speed sensors 24 are mounted to the wheels 22 and measure the speed of the wheels 22. The friction brakes 26 are mounted to the wheels 22 and resist rotation of the wheels 22 when the friction brakes 26 are applied. The friction brakes 26 may include drum brakes and/or disc brakes.

The steering actuator 28 is coupled to a steering linkage (not shown) and is operable to translate the steering linkage and thereby turn the wheels 22 in the front of the truck 10. The steering actuator 28 may be a hydraulic and/or electric actuator. If a steering column (not shown) of the truck 10 is coupled to the steering linkage, the steering actuator 28 may reduce the amount of effort that the driver must exert to turn truck 10 left or right. In various implementations, the steering column may not be coupled to the steering linkage, and the steering actuator 28 may translate the steering linkage in response to an electronic signal that is generated based on the position of a steering wheel (not shown) of the truck 10. When the steering actuator 28 is electronically controlled in this way, the steering system of the truck 10 may be referred to as a steer-by-wire system.

The camera 30 is mounted to the cab 14 and is located and oriented such that the camera 30 is operable to generate an image of the cargo bed 16 such as the image shown in FIG. 3. Thus, when the trailer 12 is attached to the truck 10, the camera 30 is operable to generate an image of the cargo bed 16 and the trailer 12. The camera 30 is rear facing and may have a viewing angle of 180 degrees.

The user interface device 32 may include an electronic display (e.g., a touchscreen) that displays the images captured by the cameras 30. In this regard, the user interface device 32 may be or include an electronic display disposed in a center console (not shown) of the truck 10 and/or a full display mirror, which may replace a rearview mirror and provide an electronic version of a rearview mirror image without showing objects within the cab 14 such as headrests. In addition, the user interface device 32 may include a heads-up display (HUD) that, for example, projects text and/or images onto a windshield (not shown) of the truck 10. Further, the user interface device 32 may include one or more vibrators mounted to, for example, the steering wheel and/or seats of the truck 10 to provide haptic feedback to the driver. Moreover, the user interface device 32 may include a speaker that is operable to generate a sound or audible message within the cab 14.

The VCM 34 determines a distance between the cab 14 and the trailer 12 and a width of the trailer 12 based on one or more images generated by the camera 30. Additionally or alternatively, the VCM 34 may determine the cab-to-trailer distance and the trailer width based on an input from a sensor other than the camera 30, such as a laser sensor or an ultrasound sensor. The VCM 34 then identifies potential contact between the cab 14 and the trailer 12 based on the cab-to-trailer distance and the trailer width. In turn, the VCM 34 sends a signal to the user interface device 32 to warn a driver of the truck 10 of the potential contact. Also, when potential contact is identified, the VCM 34 may apply the brakes of the truck 10 and/or control the steering actuator 28 to increase an amount of effort that the driver must exert to steer the truck 10 in at least one direction (i.e., left or right).

The trailer 12 includes a body 44 having a front end 46, an overhang 48 that hangs over the cargo bed 16 of the truck 10 when the trailer 12 is attached thereto, and a gooseneck or kingpin 50 that projects from a bottom surface 52 of the overhang 48. To attach the trailer 12 to the truck 10, the kingpin 50 of the trailer 12 is inserted into the fifth wheel hitch 18 of the truck 10. The fifth wheel hitch 18 of the truck 10 and the kingpin 50 of the trailer 12 may be collectively referred to as a fifth wheel coupling. The trailer 12 may also include brakes (not shown), and the VCM 34 may apply the trailer brakes when potential contact between the cab 14 and the trailer 12 is identified.

FIG. 2 shows sample dimensions of the trailer 12. These sample dimensions are industry-wide standards and include a trailer width of 96 inches (in.), a distance of 48 in. from one side of the trailer 12 to the center of the kingpin 50 of the trailer 12, and a distance between the cab 14 of the truck 10 and the fifth wheel hitch 18 of the truck 10 within a range of 38 in. to 42 in. In addition, FIG. 2 indicates that one side of the trailer 12 may contact the cab 14 of the truck 10 with an angle between the longitudinal axis of the trailer 12 and a lateral axis of the truck 10 is −4 degrees. However, this angle will vary based on the width of the cab 14, the width of the trailer 12, and the distance between the cab 14 of the truck 10 and the fifth wheel hitch 18 of the truck 10. Also, in some cases, the front end 46 of the trailer 12 may contact the cab 14 of the truck 10 before the side of the trailer 12 contacts the cab 14.

Figure 4:
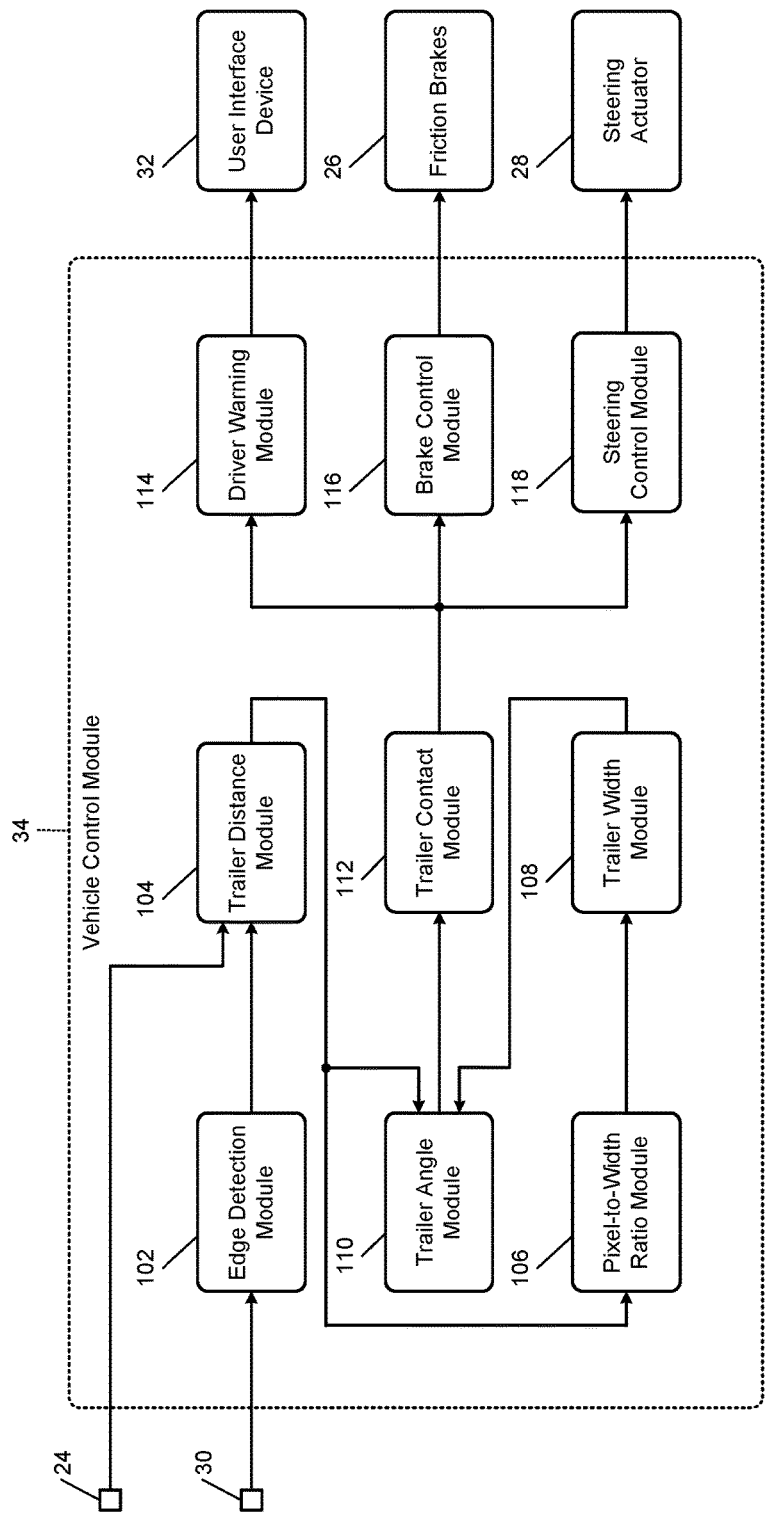
FIG. 4 is a functional block diagram of an example control system according to the principles of the present disclosure.

Referring now to FIG. 4, the VCM 34 includes an edge detection module 102, a trailer distance module 104, a pixel-to-width ratio module 106, a trailer width module 108, a trailer angle module 110, and a trailer contact module 112. The edge detection module 102 detects various edges of the cargo bed 16 and various edges on the front end 46 of the trailer 12 in the images generated by the camera 30, and outputs a signal indicating the locations of the edges detected. In one example, referring briefly to FIGS. 1 and 2, the edge detection module 102 detects a left vertical front edge 54 of the trailer 12, a right vertical front edge 56 of the trailer 12, and/or a lowermost horizontal front edge 58 of the trailer 12. In another example, referring briefly to FIG. 3, the edge detection module 102 detects a left longitudinal edge 60 on the left side 40 of the cargo bed 16, a right longitudinal edge 62 on the right side 42 of the cargo bed 16, and/or a horizontal edge 64 of the front end 36 of the cargo bed 16.

Referring again to FIG. 4, the trailer distance module 104 determines one or more distances between the cab 14 of the truck 10 and the trailer 12 and outputs a signal indicating the distances determined. In one example, the trailer distance module 104 determines the minimum distance between the cab 14 of the truck 10 and the trailer 12. In another example, the trailer distance module 104 identifies intersections between the left and right longitudinal edges 60 and 62 of the cargo bed 16 and a front end plane of the trailer 12 in which one or more front edges of the trailer 12 are disposed. The trailer distance module 104 then determines distances between the cab 14 of the truck 10 and those intersections. In yet another example, the trailer distance module 104 determines a distance from the cab 14 to the front end plane of the trailer 12 along the longitudinal centerline of the truck 10.

The trailer distance module 104 may determine distances from the cab 14 to various locations on the trailer 12 such as the front end plane of the trailer 12 or the sides of the trailer 12. The trailer distance module 104 may then the minimum distance between the cab 14 and the trailer 12 equal to a minimum value of the distances determined. The trailer distance module 104 may determine the distances from the cab 14 to locations on the trailer 12 using vision-based ranging. For example, the trailer distance module 104 may determine the distances from the cab 14 to various locations on the trailer 12 based on two or more images of the trailer 12 and the distance traveled as the images were taken. In other words, the trailer distance module 104 may analyze the motion of the locations on the trailer 12 relative to the distance traveled by the truck 10 and the trailer 12 to determine the distances from the cab 14 to the locations. The trailer distance module 104 may determine the distance travelled by the truck 10 and the trailer 12 based on an input from the wheel speed sensor 24.

In one example, the camera 30 generate a first image of the trailer 12 before the truck 10 and the trailer 12 travel a first distance, and the camera 30 generates a second image of the trailer 12 after the truck 10 and the trailer 12 travel a first distance. As noted above, the trailer distance module 104 may determine the first distance based on input from the wheel speed sensor 24. The trailer distance module 104 may then determine the distance from the cab 14 to various locations on the trailer 12 based on the movement of the locations in the first and second images and the first distance.

In addition to or instead of using vision-based ranging, the trailer distance module 104 may determine the distances from the cab 14 to various locations on the trailer 12 based on a distance travelled by the truck 10 and the trailer 12, a position of the camera 30 on the truck 10, a steering angle of the truck 10, an angle between the longitudinal centerline of the trailer 12 and the longitudinal centerline of the truck 10, a track width of the truck 10, a wheelbase of the truck 10, a track width of the trailer 12, and/or a wheelbase of the trailer 12. The trailer distance module 104 may determine the distances from the cab 14 to locations on the trailer 12 based on these parameters using a function, equation, mapping, and/or a mathematical model such as a vehicle dynamics model.

Also, as noted above, the trailer distance module 104 may determine the distances between the cab 14 of the truck 10 and locations where a front end plane of the trailer 12 intersects the left and right longitudinal edges 60 and 62 of the cargo bed 16. For example, referring briefly to FIG. 3, the left and right vertical front edges 54 and 56 of the trailer 12 may be disposed within a plane 66. Thus, the trailer distance module 104 may determine a first distance between the cab 14 of the truck 10 and a location 68 of an intersection between the plane 66 and the left longitudinal edge 60 of the cargo bed 16. Similarly, the trailer distance module 104 may determine a second distance between the cab 14 of the truck 10 and a location 70 of an intersection between the plane 66 and the right longitudinal edge 62 of the cargo bed 16. The first and second distance may be equal to one another when, for example, the longitudinal centerline of the trailer 12 is aligned with the longitudinal centerline of the truck 10.

With continued reference to FIG. 3, the left and right vertical front edges 54 and 56 of the trailer 12 may be disposed within a plane 72 that is rearward of the plane 66. Thus, the trailer distance module 104 may determine a third distance between the cab 14 of the truck 10 and a location 74 of an intersection between the plane 72 and the left longitudinal edge 60 of the cargo bed 16. Similarly, the trailer distance module 104 may determine a fourth distance between the cab 14 of the truck 10 and a location 76 of an intersection between the plane 72 and the right longitudinal edge 62 of the cargo bed 16. The third and fourth distances may be equal to one another when, for example, the longitudinal centerline of the trailer 12 is aligned with the longitudinal centerline of the truck 10.

Still referring to FIG. 3, the left and right vertical front edges 54 and 56 of the trailer 12 may be disposed within a plane 78 that intersects the left longitudinal edge 60 of the cargo bed 16 at the location 68 and intersects the right longitudinal edge 62 of the cargo bed 16 at the location 76. Thus, the trailer distance module 104 may determine the first distance between the cab 14 of the truck 10 and the location 68 and the fourth distance between the cab 14 of the truck 10 and the location 76. The first and fourth distances may be different than one another when, for example, the longitudinal centerline of the trailer 12 is angularly offset relative to the longitudinal centerline of the truck 10. As indicated above, the planes 66, 72, 78 may be referred to as front end planes.

Further, as noted above, the trailer distance module 104 may determine a distance from the cab 14 to the front end plane of the trailer 12 along the longitudinal centerline of the truck 10. To do this, the trailer distance module 104 may first determine the distances between the cab 14 and locations where a front end plane of the trailer 12 intersects the left and right longitudinal edges 60 and 62 of the cargo bed 16. The trailer distance module 104 may then determine the average value of these distances to obtain the distance from the cab 14 to the front end plane of the trailer 12 along the longitudinal centerline of the truck 10.

Referring again to FIG. 4, the pixel-to-width ratio module 106 selects a pixel-to-width ratio based on the distances between the cab 14 of the truck 10 and the front end 46 of the trailer 12 and outputs a signal indicating the pixel-to-width ratios selected. A pixel-to-width ratio is a ratio of a number of pixels spanning across the width of the trailer 12 in an image of the trailer 12 to the width of the trailer 12. The pixel-to-width ratio module 106 selects the pixel-to-width ratio from predetermined ratios based on the locations where the front end plane of the trailer 12 intersect the left and right longitudinal edges 60 and 62 of the cargo bed 16. The pixel-to-width ratio module 106 may select a higher pixel-to-width ratio as the distance between the cab 14 of the truck 10 and the front end plane of the trailer 12 decreases and vice versa. For example, the pixel-to-width ratio module 106 may select a first pixel-to-width ratio for the plane 66 and a second pixel-to-width ratio for the plane 72, where the second pixel-to-width ratio is less than the first pixel-to-width ratio.

If the distances from the cab 14 of the truck 10 to the locations where the front end plane of the trailer 12 intersects the left and right longitudinal edges 60 and 62 of the cargo bed 16 are equal to one another, the pixel-to-width ratio module 106 may select a pixel-to-width ratio based on either distance. If the distances from the cab 14 of the truck 10 to the locations where the front end plane of the trailer 12 intersects the left and right longitudinal edges 60 and 62 of the cargo bed 16 are different than one another, the pixel-to-width ratio module 106 may retrieve a pixel-to-width ratio corresponding to each distance. The pixel-to-width ratio module 106 may then determine an average value of the two pixel-to-width ratios, and output the average value as the selected pixel-to-width ratio.

The distances from the cab 14 of the truck 10 to the locations where the front end plane of the trailer 12 intersects the left and right longitudinal edges 60 and 62 of the cargo bed 16 are equal to one another when the truck-to-trailer angle is zero. As discussed above, the truck-to-trailer angle may be zero when the truck 10 is pulling the trailer 12 forward in a straight line. Thus, the trailer distance module 104 may determine the distance to the front end plane of the trailer 12 when the truck 10 is pulling the trailer 12 forward in a straight line. In this case, the trailer distance module 104 may determine only one distance from the cab 14 to the front end plane of the trailer 12, and the pixel-to-width ratio module 106 may select a single pixel-to-width ratio for the entire width of the trailer 12. The trailer distance module 104 may determine whether the truck 10 is pulling the trailer 12 forward in a straight line based on inputs from the wheel speed sensor 24 and a steering angle sensor (not shown)

The trailer width module 108 determines a width of the trailer 12 based on the number of pixels spanning across the width of the trailer 12 and the corresponding pixel-to-width ratio, and outputs a signal indicating the trailer width determined. For example, the trailer width module 108 may multiply the number of pixels spanning across the width of the trailer 12 by the corresponding pixel-to-width ratio to obtain the width of the trailer 12. The pixels spanning across the width of the trailer 12 may include those pixels that are horizontally aligned and disposed between the left and right vertical front edges 54 and 56 of the trailer 12.

The trailer width module 108 may determine a maximum width of the trailer 12 within a truck cab envelope. The truck cab envelope is a geometric boundary that includes any portion of the trailer 12 that may contact the cab 14 of the truck 10 during a turning maneuver such as portion 80 of the trailer 12 shown in FIG. 1. The trailer width module 108 may determine the maximum width of the trailer 12 within the truck cab envelope based on the left and right vertical front edges 54 and 56 of the trailer 12. For example, the trailer width module 108 may determine the distance between the left and right vertical front edges 54 and 56 of the trailer 12 at different vertical locations, and set the maximum width of the trailer 12 equal to the greatest distance determined.

The trailer angle module 110 determines a current angle between the longitudinal centerline of the trailer 12 and the longitudinal centerline of the truck 10 and an angle between the longitudinal centerline of the trailer 12 and the longitudinal centerline of the truck 10 when the trailer 12 contacts the cab 14 of the truck 10. This latter angle is referred to herein as a contact angle. The trailer angle module 110 outputs a signal indicating the current and contact angles between the longitudinal centerline of the trailer 12 and the longitudinal centerline of the truck 10.

The trailer angle module 110 may determine the current angle based on the maximum width of the trailer 12 within the truck cab envelope and the minimum distance between the cab 14 and the trailer 12 corresponding to the maximum width. For example, the trailer angle module 110 may determine the current angle using a relationship such as $$\theta = \tan^{-1}\left(\frac{(W_{trailer})_{max}}{2(D_{trailer})_{min}}\right) \quad (1)$$

where $\theta$ is the current angle, $(W_{trailer})_{max}$ is the maximum width of the trailer 12 within truck cab envelope, and $(D_{trailer})_{min}$ is the minimum distance between the cab 14 and the trailer 12 corresponding to the maximum width.

Additionally or alternatively, the trailer angle module 110 may determine the current angle based on the locations where the front end plane of the trailer 12 intersect the left and right longitudinal edges 60 and 62 of the cargo bed 16 of the truck 10. For example, the trailer angle module 110 may determine the current angle is equal to zero when the distances between the cab 14 and the truck and the locations of these two intersections are equal to one another, as is the case with the planes 66 and 72 shown in FIG. 3. In another example, the trailer angle module 110 may determine the current angle is not equal to zero when the distances between the cab 14 and the truck and the locations of these two intersections are different than one another, as is the case with the plane 78 shown in FIG. 3.

The trailer angle module 110 may determine the contact angle based on the width of the cab 14 of the truck 10 and a distance from the cab 14 to the front end plane of the trailer 12 along the longitudinal centerline of the truck 10. For example, the trailer angle module 110 may determine the contact angle using a relationship such as $$\alpha = \tan^{-1}\left(\frac{2(D_{trailer})_{center}}{W_{truck}}\right) \quad (2)$$

where $\alpha$ is the contact angle, $W_{truck}$ is the width of the cab 14 of the truck 10, and $(D_{trailer})_{center}$ is the distance from the cab 14 to the front end plane of the trailer 12 along the longitudinal centerline of the truck 10.

The trailer contact module 112 identifies potential contact between the trailer 12 and the cab 14. The trailer contact module 112 may identify potential contact between the trailer 12 and the cab 14 when the current angle between the centerlines of the truck 10 and the trailer 12 is within a first percentage of the contact angle. The first percentage may be predetermined and/or may be determined based on a rate of change in the current angle between the centerlines of the truck 10 and the trailer 12. For example, the trailer contact module 112 may select the first percentage from a plurality of predetermined percentages based on the rate of change in the current angle. The trailer contact module 112 may select a higher value for the first percentage as the rate of change in the current angle increases and vice versa.

The trailer contact module 112 may identify potential contact between the trailer 12 and the cab 14 of the truck 10 when the minimum distance between the cab 14 and the trailer 12 is less than a first distance. The first distance may be predetermined and/or may be determined based on a rate of change in the minimum distance between the cab 14 and the trailer 12. For example, the trailer contact module 112 may select the first distance from a plurality of predetermined distances based on the rate of change in the minimum distance. The trailer contact module 112 may select a higher value for the first distance as the rate of change in the minimum distance increases and vice versa.

With continued reference to FIG. 4, the VCM 34 may further include a driver warning module 114, a brake control module 116, and a steering control module 118. The driver warning module 114 controls the user interface device 32 to warn the driver when potential contact between the trailer 12 and the truck 10 is identified. For example, the driver warning module 114 may output a signal to the user interface device 32 indicating a text message or graphical image to be displayed by the user interface device 32, an audible message to be output by the user interface device 32, and/or a type of vibration to be generated by the user interface device 32.

The brake control module 116 applies the friction brakes 26 of the truck 10 when potential contact between the trailer 12 and the truck 10 is identified. The trailer 12 may also include brakes, as discussed above, and the brake control module 116 may apply the brakes of the trailer 12 when potential contact between the trailer 12 and the truck 10 is identified. The friction brakes 26 may be electronically controlled, and the brake control module 116 may apply the friction brakes 26 by sending a control signal to the friction brakes 26.

The steering control module 118 controls the steering actuator 28 to increase the effort that the driver must exert to steer the truck 10 in at least one direction (i.e., left or right) when potential contact between the trailer 12 and the truck 10 is identified. For example, the steering control module 118 may control the steering actuator 28 to increase the effort required to steer the truck 10 to the right in order to prevent the contact between the cab 14 and the trailer 12 shown in FIG. 2. The steering control module 118 may increase the steering effort by an amount that is inversely proportional to the minimum distance between the cab 14 and the trailer 12. The steering control module 118 may increase the steering effort such that the steering wheel of the truck 10 cannot be turned in at least one direction when the minimum distance between the cab 14 and the trailer 12 is less than a predetermined distance.

The steering control module 118 may increase the amount of effort required to steer the truck 10 by outputting a signal to the steering actuator 28 indicating a target amount by which to increase the steering effort and a corresponding direction. If the steering column of the truck 10 is coupled to the steering linkage of the truck 10, the steering actuator 28 may reduce the amount of steering assistance that it provides to assist the driver in steering the truck 10 left or right. If the truck 10 has a steer-by-wire system, the steering actuator 28 may resist rotation of the steering wheel of the truck 10 while performing all of the work to move the steering linkage. In this regard, the steering actuator 28 may include one actuator to provide tactile feedback to the driver via the steering wheel, and another actuator that actually moves the steering linkage.

Figure 5:
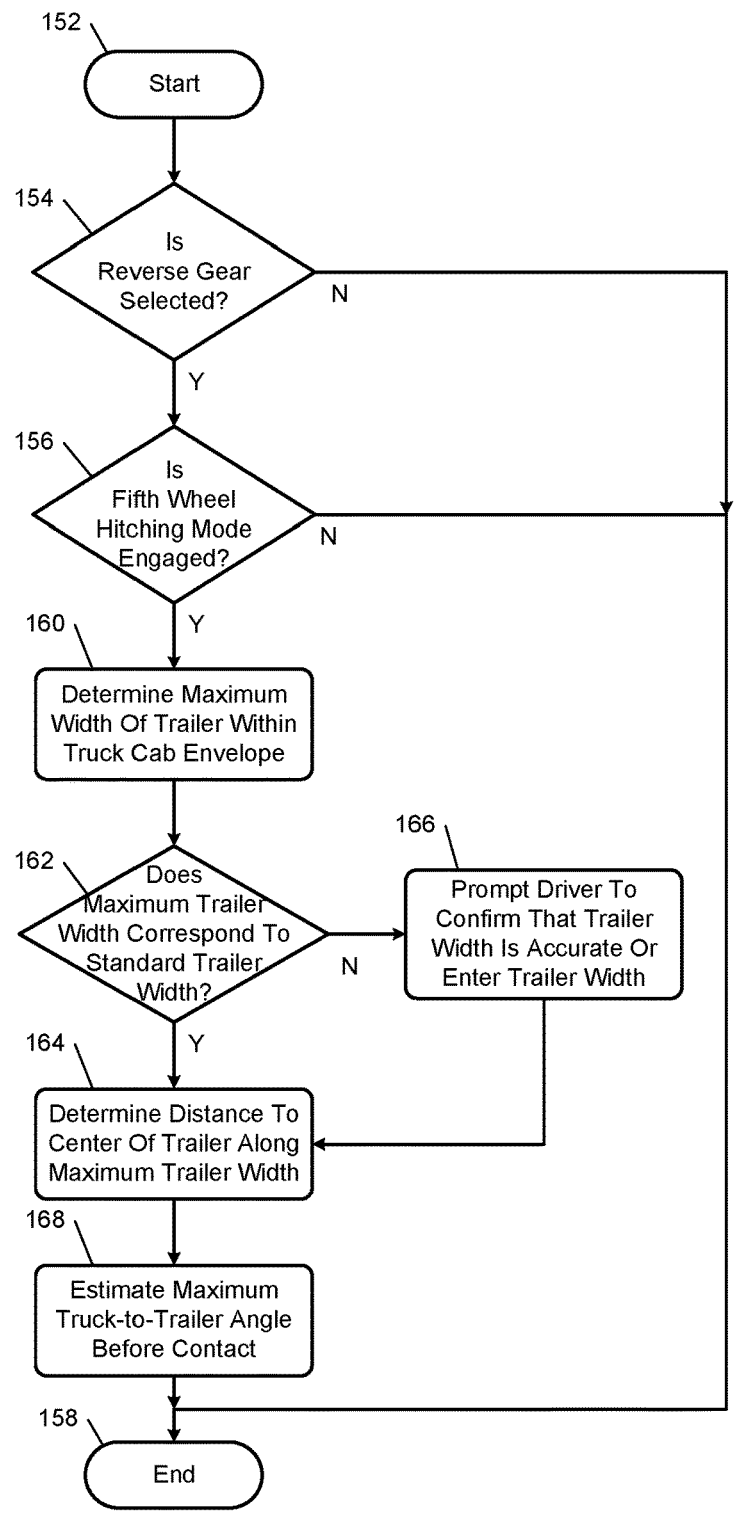
FIG. 5 is a flowchart illustrating an example method for estimating a maximum truck-to-trailer angle before a fifth wheel trailer contacts a truck to which the trailer is attached.

Referring now to FIG. 5, a method for estimating a maximum truck-to-trailer angle before the trailer 12 contacts the cab 14 of the truck 10 begins at 152. As used herein, truck-to-trailer angle refers to the angle between the longitudinal centerline of the truck 10 and the longitudinal centerline of the trailer 12. The truck-to-trailer angle is zero when the longitudinal centerlines of the truck 10 and the trailer 12 are aligned, such as when the truck 10 is pulling the trailer 12 forward in a straight line. At 154, the trailer width module 108 determines whether a reverse gear is selected. The trailer width module 108 may determine whether a reverse gear is selected based on an input from a gear selector sensor (not shown) of the truck 10 and/or from a transmission control module (not shown) of the truck 10. If a reverse gear is selected, the method continues at 156. Otherwise, the method continues at 158.

At 156, the trailer width module 108 determines whether a fifth wheel hitching mode is engaged. The trailer width module 108 may determine whether the fifth wheel hitching mode is engaged based on an input from the user interface device 32. The driver of the truck 10 may press a button or touchscreen of the user interface device 32 to enable the fifth wheel hitching mode. When the fifth wheel hitching mode is engaged, the user interface device 32 assists the driver in attaching the trailer 12 to the truck 10 using, for example, visual aids and/or audible messages.

At 160, the trailer width module 108 determines the maximum width of the trailer 12 within the truck cab envelope as described above with reference to FIG. 4. At 162, the trailer width module 108 determines whether the maximum trailer width corresponds to a standard trailer width (e.g., 96 in., 104 in.). If the maximum trailer width corresponds to a standard trailer width, the method continues at 164. Otherwise, the method continues at 166. At 166, the trailer width module sends a command to the user interface device 32 to prompt the driver to confirm that the maximum trailer width is accurate or enter an accurate trailer width.

At 164, the trailer distance module 104 determines the distance from the cab 14 of the truck 10 to the center of the trailer 12 along the maximum trailer width. The trailer distance module 104 may determine the distance to the center of the trailer 12 based on the distances from the cab 14 to the intersections between the front end plane of the trailer 12 and the left and right longitudinal edges 60 and 62 of the cargo bed 16 shown in FIG. 3. For example, the trailer distance module 104 may determine the average value of the distances from the cab 14 to these two intersections, and set the distance to the center of the trailer 12 equal to the average value.

At 168, the trailer angle module 110 determines the maximum truck-to-trailer angle before the trailer 12 contacts the cab 14 of the truck 10. For example, the trailer angle module 110 may determine the contact angle as discussed above with reference to FIG. 4, and set the maximum truck-to-trailer angle before contact equal to an angle that is less than the contact angle by a predetermined amount. In other words, the trailer angle module 110 may subtract the predetermined amount from the contact angle to obtain the maximum truck-to-trailer angle before contact.

Figure 6:
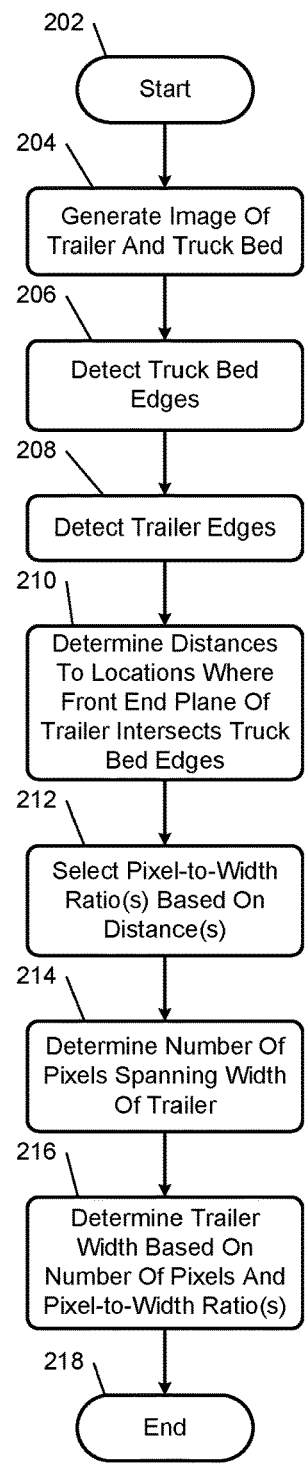
FIG. 6 is a flowchart illustrating an example method for determining a width of a fifth wheel trailer using an image generated by a cargo bed camera.

Referring now to FIG. 6, a method for determining a width of the trailer 12 using an image generated by the camera 30 begins at 202. At 204, the camera 30 generates an image of the trailer 12 and the cargo bed 16 of the truck 10. The image generated may be similar to the image shown in FIG. 3 except that the trailer 12 will also be included in the image.

At 206, the edge detection module 102 detects edges of the cargo bed 16 of the truck 10 in the image. For example, referring briefly to FIG. 3, the edge detection module 102 may detect the left longitudinal edge 60 of the cargo bed 16, the right longitudinal edge 62 of the cargo bed 16, and/or the horizontal edge 64 of the cargo bed 16. At 208, the edge detection module 102 detects edges of the trailer 12 in the image. For example, referring briefly to FIGS. 1 and 2, the edge detection module 102 may detect the left vertical front edge 54 of the trailer 12, the right vertical front edge 56 of the trailer 12, and/or the lowermost horizontal front edge 58 of the trailer 12.

At 210, the trailer distance module 104 determines the distances from the cab 14 of the truck 10 to the locations where the front end plane of the trailer 12 intersects the left and right longitudinal edges 60 and 62 of the cargo bed 16 of the truck 10. For example, if the front end 46 of the trailer 12 is disposed within the plane 66 shown in FIG. 3, the trailer distance module 104 determines the distances to the locations 68 and 70 where the plane 66 intersects the left and right longitudinal edges 60 and 62 of the cargo bed 16. In another example, if the front end 46 of the trailer 12 is disposed within the plane 72 shown in FIG. 3, the trailer distance module 104 determines the distances to the locations 74 and 76 where the plane 72 intersects the left and right longitudinal edges 60 and 62 of the cargo bed 16. In yet another example, if the front end 46 of the trailer 12 is disposed within the plane 78 shown in FIG. 3, the trailer distance module 104 determines the distances to the locations 68 and 76 where the plane 78 intersects the left and right longitudinal edges 60 and 62 of the cargo bed 16.

At 212, the pixel-to-width ratio module 106 selects a pixel-to-width ratio based on the distances from the cab 14 to the locations where the front end plane of the trailer 12 intersects the left and right longitudinal edges 60 and 62 of the cargo bed 16. The pixel-to-width ratio module 106 may select a pixel-to-width ratio as discussed above with reference to FIG. 4. At 214, the trailer width module 108 determines the number of pixels spanning across the width of the trailer 12. For example, the trailer width module 108 may determine the number of pixels in the image of the trailer 12 that are horizontally aligned and disposed between the left and right vertical front edges 54 and 56 of the trailer 12.

At 216, the trailer width module 108 determines the width of the trailer 12 based on the number of pixels spanning across the width of the trailer 12 and the selected pixel-to-width ratio. For example, the trailer width module 108 may multiply the number of pixels spanning across the width of the trailer 12 by the corresponding pixel-to-width ratio to obtain the width of the trailer 12. The method ends at 218.

Figure 7:
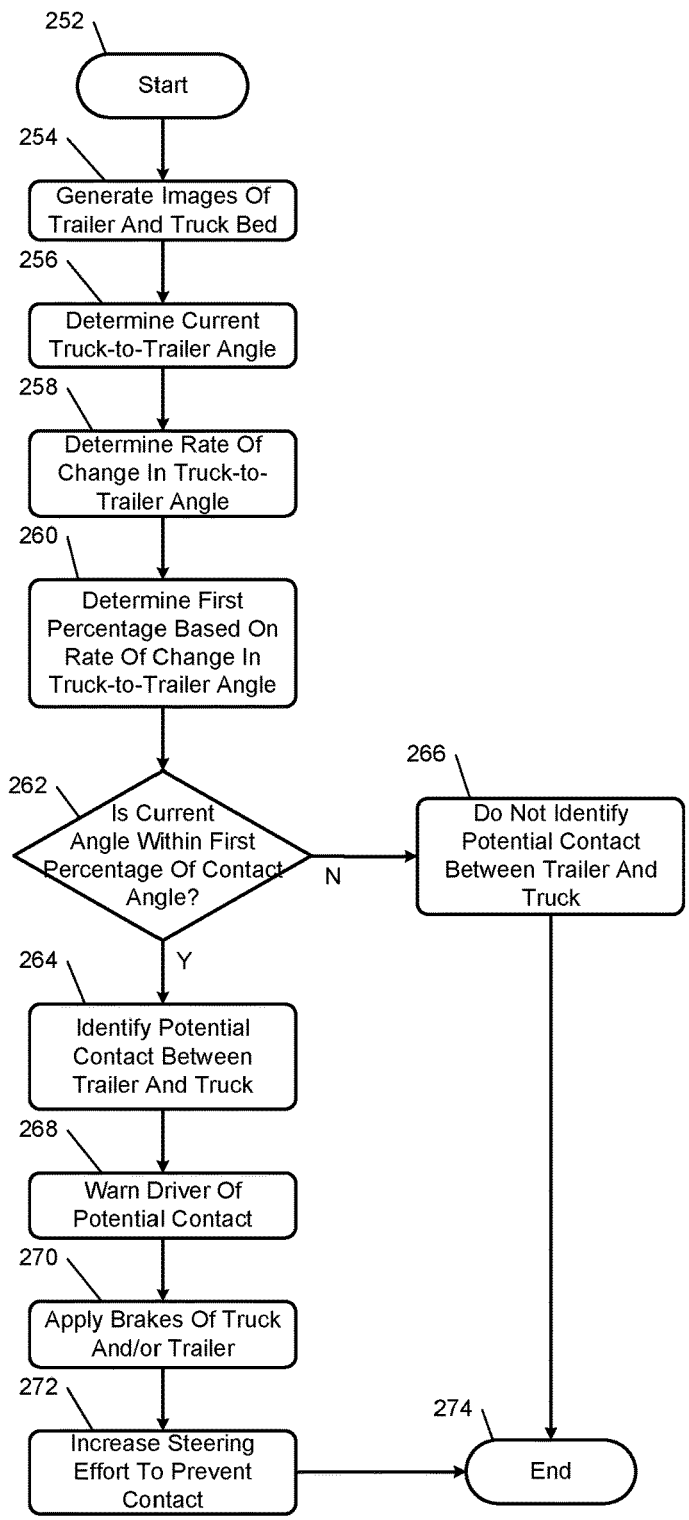
FIG. 7 is a flowchart illustrating an example method for identifying potential contact between a fifth wheel trailer and a truck and for taking remedial actions when potential contact is identified.

Referring now to FIG. 7, a method for identifying potential contact between the trailer 12 and the truck 10 and for taking remedial actions when potential contact is identified begins at 252. At 254, the camera 30 generates images of the trailer 12 and the cargo bed 16 of the truck 10. The images generated may be similar to the image shown in FIG. 3 except that the trailer 12 will also be included in the image.

At 256, the trailer angle module 110 determines the current truck-to-trailer angle based on the image most recently generated by the camera 30. At 258, the trailer angle module 110 determines a rate of change in the truck-to-trailer angle. For example, the trailer angle module 110 may determine a difference between the current truck-to-trailer angle and a previous truck-to-trailer angle. The trailer angle module 110 may then divide this difference by the period between the times when the current and previous truck-to-trailer angles were determined to obtain the rate of change in the truck-to-trailer angle.

At 260, the trailer contact module 112 determines the first percentage based on the rate of change in the truck-to-trailer angle. For example, as discussed above, the trailer contact module 112 may select the first percentage from a plurality of predetermined percentages based on the rate of change in the current angle. The trailer contact module 112 may select a higher value for the first percentage as the rate of change in the current angle increases and vice versa.

At 262, the trailer contact module 112 determines whether the current angle is within the first percentage of the contact angle. The trailer contact module 112 may receive the contact angle from the trailer angle module 110, which may determine the contact angle as discussed above with reference to FIG. 4. If the current angle is within the first percentage of the contact angle, the method continues at 264. Otherwise, the method continues at 266. At 266, the trailer contact module 112 does not identify potential contact between the trailer 12 and the cab 14 of the truck 10.

At 264, the trailer contact module 112 identifies potential contact between the trailer 12 and the cab 14 of truck 10. At 268, the driver warning module 114 controls the user interface device 32 to warn the driver of the potential contact. At 270, the brake control module 116 applies the friction brakes 26 of the truck 10. Also, at 270, the brake control module 116 may apply the friction brakes of the trailer 12.

At 272, the steering control module 118 increases the effort that must be exert by the driver to steer the truck 10 in at least one direction. The steering control module 118 may increase the steering effort in only one direction in order to prevent driver from steering the truck 10 in a direction that causes contact while allowing the driver to steer the truck 10 in the opposite direction. The method ends at 274.

Figure 8:
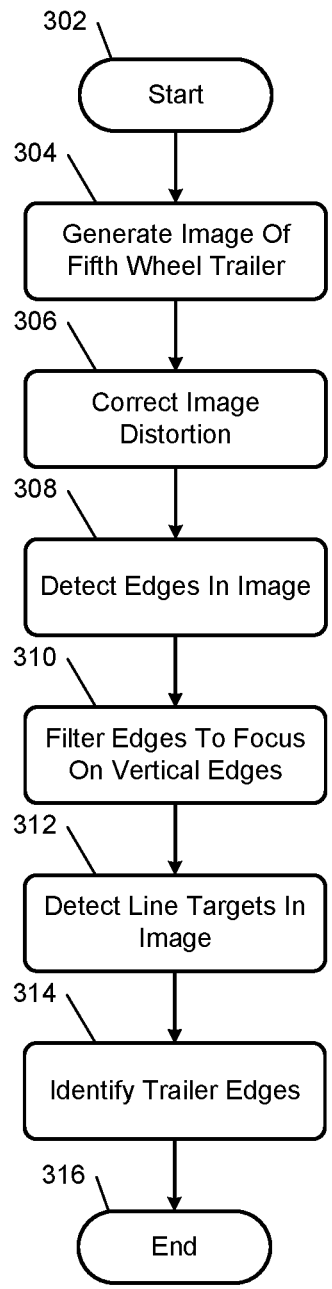
FIG. 8 is a flowchart illustrating an example method for detecting various edges of a fifth wheel trailer according to the principles of the present disclosure.

Referring now to FIG. 8, a method for detecting various edges of the trailer 12 begins at 302. While the method of FIG. 8 is described with reference to edges of the trailer 12, similar techniques may be used to detect edges of the cargo bed 16 of the truck 10. At 304, the camera 30 generates an image of the trailer 12. FIG. 9 shows an example of an image that may be generated by the camera 30, although the image may also include the cargo bed 16 of the truck 10 if the trailer 12 is attached to the truck 10 when the image is generated.

At 306, the edge detection module 102 corrects any lens distortion of the image. For example, the edge detection module 102 may employ image dewarping techniques to eliminate fish eye distortion where the resolution of the image changes in the edges of the image. Thus, the distribution of pixels in the image may be converted from non-uniform to uniform, and the edges of the image may be modified from curved to straight.

At 308, the edge detection module 102 detects edges of the trailer 12 in the image. Examples of the edges detected by the edge detection module 102 at 308 are shown in FIG. 10. Also, at 308, the edge detection module 102 may filter the edges detected to emphasize vertical edges using, for example, a Canny filter.

The edge detection module 102 may execute the following steps when applying a Canny filter. First, the edge detection module 102 may apply a Gaussian filter to smooth the image in order to remove noise such as small edges or other anomalous detections in the image. The Gaussian filter may delete any edge that is less than a certain length and/or any edge have a horizontal or vertical gradient that is outside of a predetermined range.

Second, the edge detection module 102 may find light intensity gradients of the image. Third, the edge detection module 102 may apply non-maximum suppression to eliminate spurious responses to edge detection. Fourth, the edge detection module 102 may apply a double threshold to determine potential edges. Fifth, the edge detection module 102 may track edges by hysteresis. For example, the edge detection module 102 may finalize the detection of edges by suppressing all edges that are weak and not connected to strong edges. The strength of the edges may be assessed based on criteria such as length, width, horizontal gradient, vertical gradient, and/or darkness.

At 310, the edge detection module 102 filters the edges detected to focus on vertical edges. For example, the edge detection module 102 may eliminate any edge having a vertical gradient that is outside of a predetermined range. An example of this filtering is shown in FIG. 11, where the filtered edges appear as dotted lines and the unfiltered edges appear as solid lines.

At 312, the edge detection module 102 detects line targets in the image using, for example, a Hough transform or a histogram of oriented gradients (HOG) filter. Examples of line targets detected in the image are shown in FIG. 12 and labelled 82, 84, 86, 88, 90, 92, and 94. Line targets 92 and 94 are examples of false edge detections.

When applying a HOG filter, the edge detection module 102 may count occurrences of gradient orientation in localized portions of the image. Counting occurrences of gradient orientation is similar to using edge orientation histograms, scale-invariant feature transform descriptors, and shape contexts. However, counting occurrences of gradient orientation differs from these methods in that the number of gradient orientations is computed on a dense grid of uniformly spaced cells and uses overlapping local contrast normalization for improved accuracy.

At 314, the edge detection module 102 identifies edges of the trailer 12 from the line targets. Examples of the edges identified art shown in FIG. 13 and labelled 96 and 98. Edges 96 and 98 correspond to line targets 82 and 90. The edge detection module 102 may identify the edges of the trailer 12 as the laterally outermost line targets and/or as the line targets that are symmetrically disposed with respect to a centerline 100 of the image. The edges identified at 314 may be used by the trailer width module 108 to determine the width of the trailer 12. The method ends at 316.

The methods of FIGS. 5-8 are described in the context of the modules of FIG. 4. However, the particular modules that perform the steps of these methods may be different than the modules mentioned below and/or these methods may be implemented apart from the modules of FIG. 4.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a trailer distance module that determines a distance from a cab of a truck to a fifth wheel trailer attached to the truck based on an input from a sensor;
a trailer contact module that identifies potential contact between the fifth wheel trailer and the truck cab based on the cab-to-trailer distance; and
at least one of:
a driver warning module that warns a driver of the potential contact between the fifth wheel trailer and the truck cab;
a brake control module that applies a brake of at least one of the truck and the trailer when potential contact is identified; and
a steering control module that increases an amount of driver effort required to steer the truck in at least one direction when potential contact is identified.

2. The system of claim 1 further comprising a trailer width module that determines a width of the fifth wheel trailer based on the cab-to-trailer distance, wherein the trailer contact module identifies potential contact between the fifth wheel trailer and the truck cab based on the cab-to-trailer distance and the trailer width.

3. The system of claim 2 further comprising a trailer angle module that, based on the cab-to-trailer distance and the trailer width, determines an angle between a centerline of the fifth wheel trailer and a centerline of the truck when the fifth wheel trailer contacts the truck cab, wherein the trailer contact module identifies potential contact between the fifth wheel trailer and the truck cab based on the contact angle.

4. The system of claim 3 wherein:
the trailer angle module determine a current angle between the centerline of the fifth wheel trailer and the centerline of the truck; and
the trailer contact module identifies potential contact between the fifth wheel trailer and the truck cab based on a comparison of the current angle and the contact angle.

5. The system of claim 1 wherein:
the sensor is a camera mounted to the truck cab and operable to generate an image of the trailer; and
the trailer distance module determines the cab-to-trailer distance based on the image.

6. The system of claim 5 wherein:
the camera is operable to generate a first image of the fifth wheel trailer before the truck and the fifth wheel trailer travel a first distance;
the camera is operable to generate a second image of the fifth wheel trailer after the truck and the fifth wheel trailer travel the first distance; and
the trailer distance module determines the cab-to-trailer distance based on the first and second images of the trailer and the first distance using vision-based ranging.

7. The system of claim 5 wherein the trailer distance module determines the cab-to-trailer distance based on a distance travelled by the truck and the fifth wheel trailer, a position of the camera on the truck, a steering angle of the truck, an angle between a centerline of the fifth wheel trailer and a centerline of the truck, a track width of the truck, a wheelbase of the truck, a track width of the trailer, and a wheelbase of the trailer.

8. The system of claim 5 wherein:
the camera is operable to generate an image of a front edge of the trailer and side edges of a bed of the truck when the fifth wheel trailer is attached to the truck; and
the trailer distance module determines the cab-to-trailer distance based on a location of an intersection between a plane in which the front edge of the trailer is disposed and at least one of the side edges of the truck bed.

9. The system of claim 8 further comprising an edge detection module that detects the front edge of the trailer and the side edges of the truck bed in the image.

10. The system of claim 9 further comprising:
a pixel-to-width ratio module that selects a pixel-to-width ratio based on the cab-to-trailer distance; and
a trailer width module that determines a width of the trailer based on a number of pixels spanning across the width of the trailer in the image and the pixel-to-width ratio, wherein the trailer contact module identifies potential contact between the fifth wheel trailer and the truck cab based on the cab-to-trailer distance and the trailer width.

11. A method comprising:
determining a distance from a cab of a truck to a fifth wheel trailer attached to the truck based on an input from a sensor;
identifying potential contact between the fifth wheel trailer and the truck cab based on the cab-to-trailer distance; and
at least one of:
warning a driver of the potential contact between the fifth wheel trailer and the truck cab;

applying a brake of at least one of the truck and the trailer when potential contact is identified; and increasing an amount of driver effort required to steer the truck in at least one direction when potential contact is identified.

12. The method of claim 11 further comprising:

determining a width of the fifth wheel trailer based on the cab-to-trailer distance; and identifying potential contact between the fifth wheel trailer and the truck cab based on the cab-to-trailer distance and the trailer width.

13. The method of claim 12 further comprising:

based on the cab-to-trailer distance and the trailer width, determining an angle between a centerline of the fifth wheel trailer and a centerline of the truck when the fifth wheel trailer contacts the truck cab; and identifying potential contact between the fifth wheel trailer and the truck cab based on the contact angle.

14. The method of claim 13 wherein:

determining a current angle between the centerline of the fifth wheel trailer and the centerline of the truck; and identifying potential contact between the fifth wheel trailer and the truck cab based on a comparison of the current angle and the contact angle.

15. The method of claim 11 wherein the sensor is a camera mounted to the truck cab and operable to generate an image of the trailer, the method further comprising determining the cab-to-trailer distance based on the image.

16. The method of claim 15 wherein:

the camera is operable to generate a first image of the fifth wheel trailer before the truck and the fifth wheel trailer travel a first distance; and the camera is operable to generate a second image of the fifth wheel trailer after the truck and the fifth wheel trailer travel the first distance, the method further comprising determining the cab-to-trailer distance based on the first and second images of the trailer and the first distance using vision-based ranging.

17. The method of claim 15 further comprising determining the cab-to-trailer distance based on a distance travelled by the truck and the fifth wheel trailer, a position of the camera on the truck, a steering angle of the truck, an angle between a centerline of the fifth wheel trailer and a centerline of the truck, a track width of the truck, a wheelbase of the truck, a track width of the trailer, and a wheelbase of the trailer.

18. The method of claim 15 wherein the camera is operable to generate an image of a front edge of the trailer and side edges of a bed of the truck when the fifth wheel trailer is attached to the truck, the method further comprising determining the cab-to-trailer distance based on a location of an intersection between a plane in which the front edge of the trailer is disposed and at least one of the side edges of the truck bed.

19. The method of claim 18 further comprising detecting the front edge of the trailer and the side edges of the truck bed in the image.

20. The method of claim 19 further comprising:

selecting a pixel-to-width ratio based on the cab-to-trailer distance;

determining a width of the trailer based on a number of pixels spanning across the width of the trailer in the image and the pixel-to-width ratio; and identifying potential contact between the fifth wheel trailer and the truck cab based on the cab-to-trailer distance and the trailer width.

* * * * *